US012659948B2

(12) United States Patent (10) Patent No.: US 12,659,948 B2
Hu et al. (45) Date of Patent: Jun. 16, 2026

(54) DATA TRANSMISSION SCHEME

(71) Applicant: ZTE CORPORATION, Shenzhen (CN)

(72) Inventors: Linxi Hu, Shenzhen (CN); Nan Zhang, Shenzhen (CN); Zhen Yang, Shenzhen (CN); Jianqiang Dai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 426 days.

(21) Appl. No.: 17/965,594

(22) Filed: Oct. 13, 2022

(65) Prior Publication Data

US 2023/0069112 A1 Mar. 2, 2023

Related U.S. Application Data

(63) Continuation of application No. PCT/CN2020/085261, filed on Apr. 17, 2020.

(51) Int. Cl.
*H04W 72/1263* (2023.01)
*H04L 1/00* (2006.01)
*H04L 1/08* (2006.01)
*H04W 72/23* (2023.01)

(52) U.S. Cl.
CPC ....... *H04W 72/1263* (2013.01); *H04L 1/0003* (2013.01); *H04L 1/08* (2013.01); *H04W 72/23* (2023.01)

(58) Field of Classification Search
CPC ... H04L 1/0003; H04L 1/0009; H04L 1/0023; H04L 1/08; H04L 1/1819; H04L 1/1825; H04L 1/1864; H04L 1/1887; H04L 1/1896; H04W 72/1263; H04W 72/23
See application file for complete search history.

(56) References Cited

U.S. PATENT DOCUMENTS

| | | | | |
|---|---|---|---|---|
| 10,873,970 B2 * | 12/2020 | Kim | ....................... | H04W 72/23 |
| 10,972,223 B2 * | 4/2021 | Zhang | .................... | H04L 1/1822 |
| 11,075,712 B2 * | 7/2021 | Gupta | .................... | H04L 1/1887 |
| 11,133,889 B2 * | 9/2021 | Kittichokechai | ..... | H04L 1/1835 |
| 2009/0147747 A1 * | 6/2009 | Cho | ....................... | H04L 1/1887 |
| | | | | 370/329 |
| 2017/0019227 A1 | 1/2017 | Han et al. | | |

(Continued)

FOREIGN PATENT DOCUMENTS

| | | |
|---|---|---|
| CN | 101686114 A | 3/2010 |
| CN | 101989901 A | 3/2011 |

(Continued)

OTHER PUBLICATIONS

International Search Report and Written Opinion for PCT Appl. No. PCT/CN2020/085261 dated Jan. 6, 2021 (6 pages).

(Continued)

*Primary Examiner* — Eric Nowlin
(74) *Attorney, Agent, or Firm* — Foley & Lardner LLP

(57) ABSTRACT

Presented are systems and methods for indicating whether a scheduled data transmission is a retransmission or a new transmission. A wireless communication device may receive a downlink control indicator (DCI) including a first indicator from a wireless communication node. The wireless communication node may transmit the DCI including the first indicator to a wireless communication device. The first indicator can be indicative of whether a scheduled data transmission is a retransmission.

15 Claims, 7 Drawing Sheets

(56) References Cited

U.S. PATENT DOCUMENTS

| | | | |
|---|---|---|---|
| 2017/0126364 A1 | 5/2017 | Kim et al. | |
| 2017/0187494 A1* | 6/2017 | Tirronen | H04L 1/1887 |
| 2018/0049266 A1* | 2/2018 | Eklöf | H04L 1/189 |
| 2018/0199359 A1* | 7/2018 | Cao | H04L 5/0012 |
| 2018/0359775 A1 | 12/2018 | Yi et al. | |
| 2019/0053226 A1* | 2/2019 | Xiong | H04L 1/08 |
| 2019/0141737 A1* | 5/2019 | Kim | H04W 72/23 |
| 2019/0222356 A1* | 7/2019 | Zhang | H04L 1/0003 |
| 2019/0222360 A1 | 7/2019 | Nam et al. | |
| 2019/0261333 A1* | 8/2019 | Dinan | H04L 5/0091 |
| 2019/0306876 A1 | 10/2019 | Golitschek Edler Von Elbwart et al. | |
| 2019/0312686 A1* | 10/2019 | Harada | H04W 28/04 |
| 2019/0356409 A1* | 11/2019 | Gupta | H04L 5/0091 |
| 2020/0052812 A1* | 2/2020 | Kittichokechai | H04L 1/0003 |
| 2020/0092044 A1* | 3/2020 | Park | H04L 1/189 |
| 2020/0187237 A1* | 6/2020 | Su | H04L 1/1896 |
| 2020/0196333 A1* | 6/2020 | Lin | H04L 5/0055 |
| 2020/0260485 A1* | 8/2020 | Lei | H04L 1/189 |
| 2020/0322100 A1* | 10/2020 | Cao | H04L 1/1893 |
| 2021/0250970 A1* | 8/2021 | Ekpenyong | H04L 5/0094 |
| 2021/0359887 A1* | 11/2021 | Lin | H04L 5/0051 |
| 2021/0385851 A1* | 12/2021 | Chen | H04L 1/1812 |
| 2022/0085942 A1* | 3/2022 | Kim | H04W 72/04 |
| 2022/0174651 A1* | 6/2022 | Seo | H04W 52/0229 |
| 2022/0353902 A1* | 11/2022 | Lee | H04L 1/08 |

FOREIGN PATENT DOCUMENTS

| | | | | |
|---|---|---|---|---|
| CN | 104811284 A | | 7/2015 | |
| CN | 110351775 A | * | 10/2019 | H04W 72/046 |
| CN | 110431910 A | | 11/2019 | |
| CN | 112154617 A | * | 12/2020 | H04L 1/1671 |
| CN | 112154617 B | * | 8/2023 | H04L 1/0003 |
| EP | 3794753 A1 | * | 3/2021 | |
| WO | WO-2019139713 A1 | * | 7/2019 | H04W 72/542 |
| WO | WO-2019222225 A1 | * | 11/2019 | H04L 1/1854 |
| WO | WO-2021066382 A1 | * | 4/2021 | H04L 1/08 |

OTHER PUBLICATIONS

First Examination Report for IN Appl. No. 202227058984, dated Oct. 6, 2023 (7 pages).

Extended European Search Report for EP App. No. 20895781.1 dated Dec. 20, 2023 (9 pages).

Mediatek Inc., On the issues of BG selection, 3GPP TSG RAN WG1 Meeting #91, R1-1721543, Nov. 27-Dec. 1, 2017, Reno, USA (7 pages).

First Office Action for CN Appl. No. 202080100012.5, dated May 31, 2024 (with English translation, 14 pages).

Office Action for KR Appl. No. 10-2022-7035980, dated Oct. 20, 2025 (with English translation, 6 pages).

* cited by examiner

DATA TRANSMISSION SCHEME

CROSS-REFERENCE TO RELATED APPLICATION

This application claims the benefit of priority under 35 U.S.C. § 120 as a continuation of PCT Patent Application No. PCT/CN2020/085261, filed on Apr. 17, 2020, the disclosure of which is incorporated herein by reference in its entirety.

TECHNICAL FIELD

The disclosure relates generally to wireless communications, including but not limited to systems and methods for indicating whether a scheduled data transmission is a retransmission or a new transmission.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE).

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a downlink control indicator (DCI) including a first indicator from a wireless communication node. The wireless communication node may transmit the DCI including the first indicator to a wireless communication device. The first indicator can be indicative of whether a scheduled data transmission is a retransmission.

In some embodiments, the first indicator may comprise at least one of a modulation and coding scheme (MCS), a repetition number (RN), a new data indicator (NDI), or a redundancy version (RV). In some embodiments, the first indicator may comprise a modulation and coding scheme (MCS) or a repetition number (RN). The first indicator may be indicative of whether the scheduled data transmission is a retransmission, according to a change in value of the MCS or the RN. In some embodiments, the first indicator may comprise a new data indicator (NDI) or a redundancy version (RV). The first indicator may be indicative of whether the scheduled data transmission is a retransmission, according to a value of the NDI or the RV.

In some embodiments, the wireless communication node may transmit a second indicator to the wireless communication device, the second indicator including or indicative of a plurality of constraints. In some embodiments, the wireless communication node may transmit the second indicator via at least one of a radio resource control (RRC) configuration or a media access control control element (MAC CE). In some embodiments, the second indicator may comprise at least one of a valid time interval (e.g., as a constraint), a retransmission threshold (e.g., as a constraint), or a retransmission interval (which may or may not be a constraint).

In some embodiments, the wireless communication device may be caused to determine whether the plurality of constraints are satisfied. In some embodiments, the wireless communication node may receive the scheduled transmission from the wireless communication device as a retransmission or a new transmission when the plurality of constraints are satisfied. In some embodiments, the wireless communication node may receive the scheduled transmission from the wireless communication device as a new transmission when the plurality of constraints are incompletely satisfied.

In some embodiments, the wireless communication node may transmit the scheduled data transmission to the wireless communication device as a retransmission or a new transmission when the plurality of constraints are satisfied. In some embodiments, the wireless communication node may transmit the scheduled data transmission to the wireless communication device as a new transmission when the plurality of constraints are incompletely satisfied.

In some embodiments, the wireless communication node may determine whether the scheduled data transmission is a retransmission of a most recent data transmitted or an N-th previous data transmitted, wherein N is a retransmission interval. In some embodiments, the wireless communication node may determine a valid time interval, and that a time interval between a transmit time of a first data transmission and a transmit time of a second data transmission, is smaller than or equal to the valid time interval.

In some embodiments, the wireless communication node may determine a valid time interval, and that a time interval between a receive time of a first data transmission and a receive time of a second data transmission, is smaller than or equal to the valid time interval. In some embodiments, the wireless communication node may determine a valid time interval, and that a time interval between a transmit time of a first DCI and a transmit time of a second DCI, is smaller than or equal to the valid time interval. In some embodiments, the wireless communication node may determine a valid time interval, and that a time interval between a receive time of a first DCI and a receive time of a second DCI, is smaller than or equal to the valid time interval.

In some embodiments, the wireless communication node may determine that a modulation and coding scheme (MCS) has changed from a first scheme for a most recent data transmission, to a second scheme for the scheduled data transmission. In some embodiments, the wireless communication node may determine whether the scheduled data transmission is a retransmission, responsive to a maximum transport block size of the second scheme being larger than or equal to an actual transport block size of a most recent data transmission corresponding to the first scheme. In some embodiments, the wireless communication node may determine that a retransmission count associated with data for the scheduled data transmission is within a retransmission threshold.

At least one aspect is directed to a system, method, apparatus, or a computer-readable medium. A wireless communication device may receive a downlink control information (DCI) including a first indicator from a wireless communication node. The wireless communication device may determine according to the first indicator, whether a scheduled data transmission is a retransmission.

In some embodiments, the first indicator may comprise at least one of a modulation and coding scheme (MCS), a repetition number (RN), a new data indicator (NDI), or a redundancy version (RV). In some embodiments, the first indicator may comprise a modulation and coding scheme (MCS) or a repetition number (RN). The first indicator may be indicative of whether the scheduled data transmission is a retransmission, according to a change in value of the MCS or the RN. In some embodiments, the first indicator may comprise a new data indicator (NDI) or a redundancy version (RV). The first indicator may be indicative of whether the scheduled data transmission is a retransmission, according to a value of the NDI or the RV.

In some embodiments, the wireless communication device may receive a second indicator from the wireless communication node. The second indicator may include a plurality of constraints or may be indicative of a plurality of constraints. The second indicator may include other information that does not correspond to a constraint. In some embodiments, the wireless communication device may receive the second indicator via at least one of a radio resource control (RRC) configuration or a media access control control element (MAC CE). In some embodiments, the second indicator may comprise at least one of a valid time interval, a retransmission threshold or a retransmission interval.

In some embodiments, the wireless communication device may determine whether the plurality of constraints are satisfied. In some embodiments, the wireless communication device may transmit the scheduled transmission to the wireless communication node as a retransmission or a new transmission when the plurality of constraints are satisfied. In some embodiments, the wireless communication device may transmit the scheduled transmission to the wireless communication node as a new transmission when the plurality of constraints are incompletely satisfied.

In some embodiments, the wireless communication device may determine whether the plurality of constraints are satisfied. In some embodiments, the wireless communication device may receive the scheduled data transmission from the wireless communication node as a retransmission or a new transmission when the plurality of constraints are satisfied. In some embodiments, the wireless communication device may receive the scheduled data transmission from the wireless communication node as a new transmission when the plurality of constraints are incompletely satisfied.

In some embodiments, the wireless communication device may determine whether the scheduled data transmission is a retransmission of a most recent data transmitted or an N-th previous data transmitted, wherein N is a retransmission interval. In some embodiments, the wireless communication device may receive a valid time interval and determine that a time interval between a transmit time of a first data transmission and a transmit time of a second data transmission, is smaller than or equal to the valid time interval. In some embodiments, the wireless communication device may receive a valid time interval and determine that a time interval between a receive time of a first data transmission and a receive time of a second data transmission, is smaller than or equal to the valid time interval.

In some embodiments, the wireless communication device may receive a valid time interval and determine that a time interval between a transmit time of a first DCI and a transmit time of a second DCI, is smaller than or equal to the valid time interval. In some embodiments, the wireless communication device may receive a valid time interval and determine that a time interval between a receive time of a first DCI and a receive time of a second DCI, is smaller than or equal to the valid time interval.

In some embodiments, the wireless communication device may determine that a modulation and coding scheme (MCS) has changed from a first scheme for a most recent data transmission, to a second scheme for the scheduled data transmission. In some embodiments, the wireless communication device may determine whether the scheduled data transmission is a retransmission, responsive to a maximum transport block size of the second scheme being larger than or equal to an actual transport block size of a most recent data transmission corresponding to the first scheme. In some embodiments, the wireless communication device may determine that a retransmission count associated with data for the scheduled data transmission is within a retransmission threshold.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
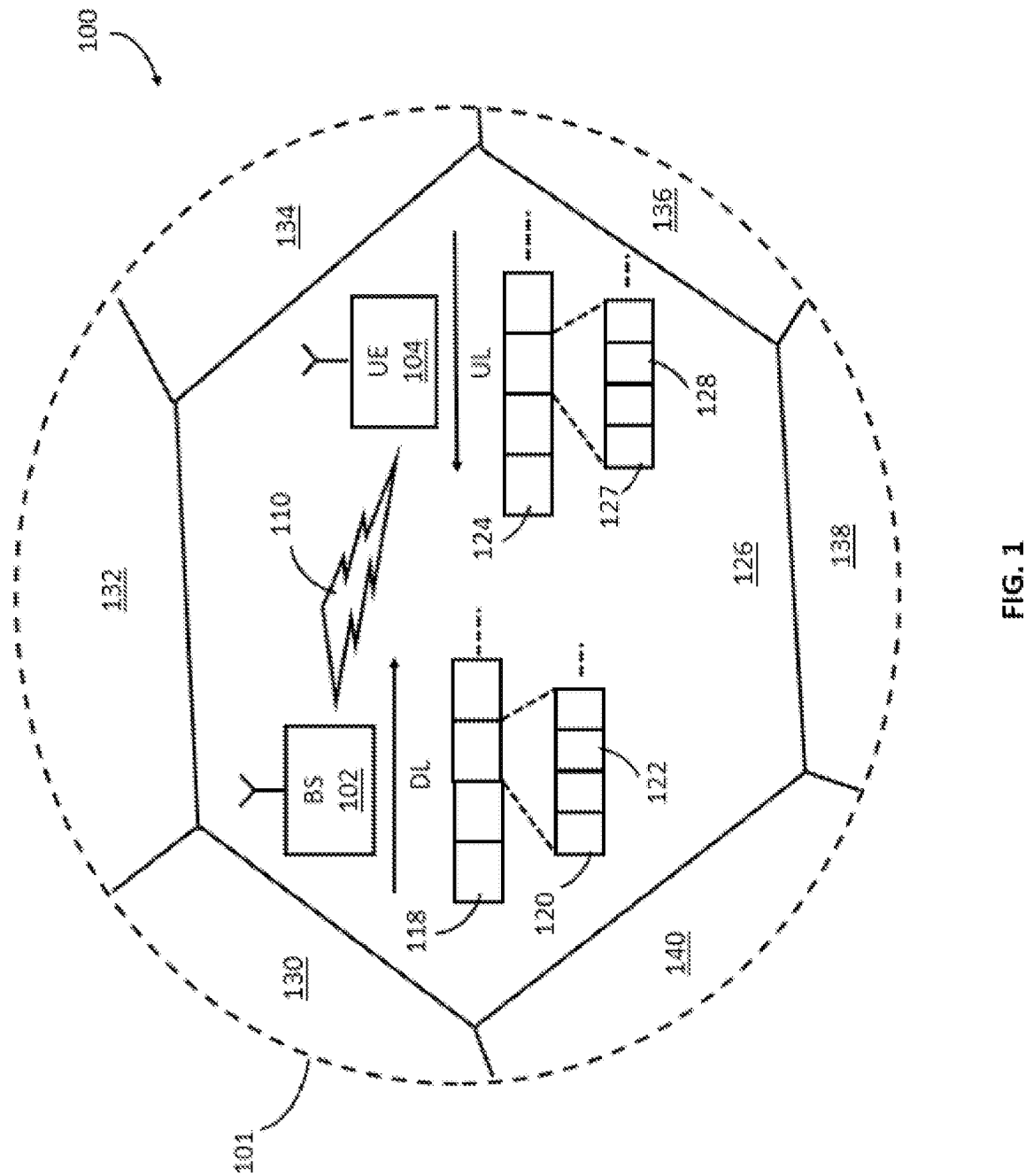
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| gNB or 5G gNB | Next Generation NodeB |
| 5G-GUTI 5G- | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | Next Generation RAN |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RBG | Resource Block Group |
| RRC | Radio Resource Control |
| RV | Redundant Version |

-continued

| Acronym | Full Name |
| --- | --- |
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
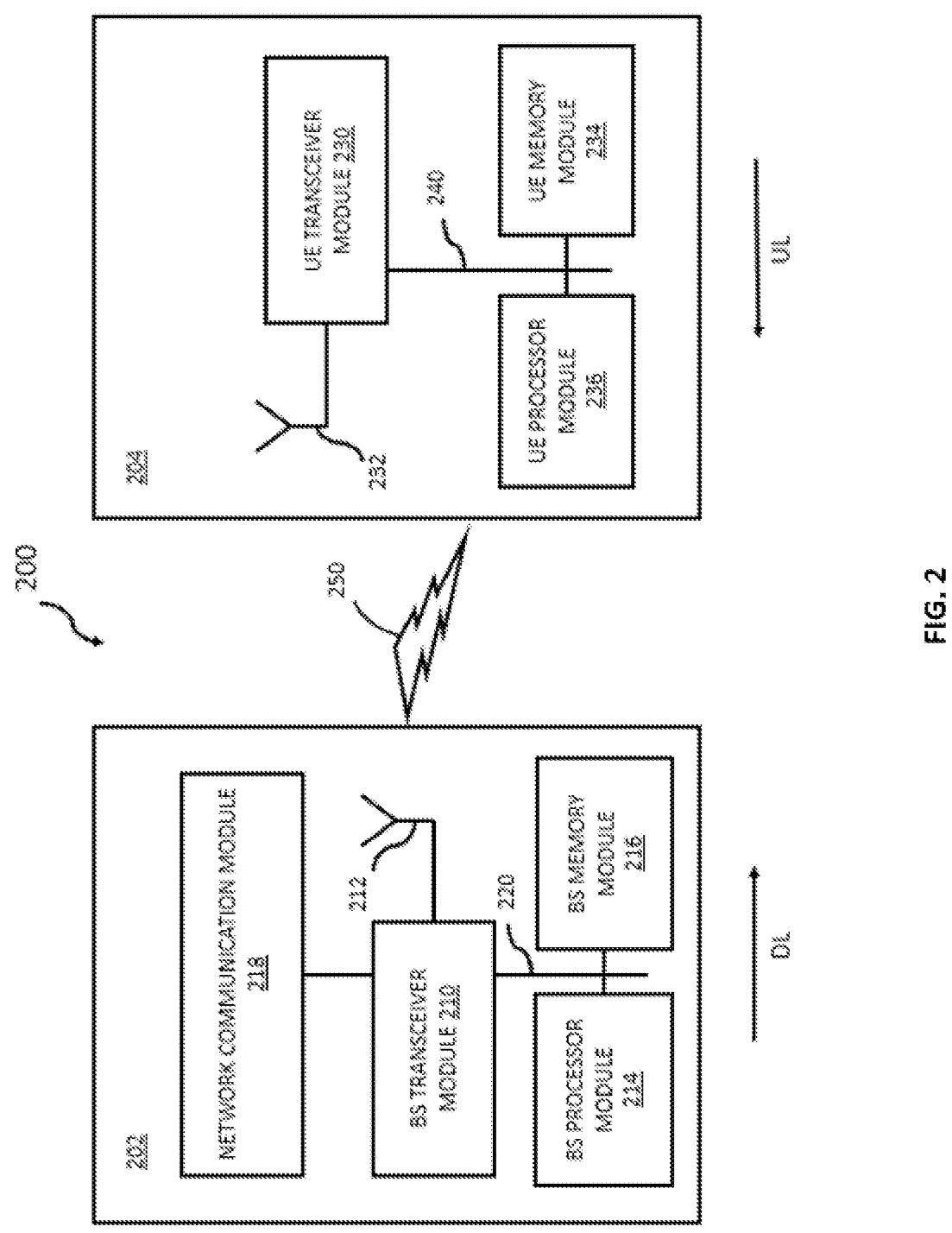
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station)

transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Communicating Retransmission Indicators

In a wireless communication system, a receiving device (e.g., a wireless communication node or wireless communication device, such as a UE or base station) can receive and/or obtain data sent and/or transmitted by a transmitting device (e.g., a wireless communication node or wireless communication device, such as a UE or base station). The receiving device may send and/or transmit information that describes the transmission of the data (e.g., feedback on whether the transmission was successful and/or correct) to the transmitting device. The transmitting device may determine to retransmit the data and/or send a new transmission based on the received information. When such information takes longer to arrive at the transmitting device, the follow-up retransmission or new transmission may incur for instance a 30% (or other percent) increase in delay and/or a 30% (or other percent) increase in cached or stored data. The systems and methods presented herein can provide or enable for instance a 20% (or other percent) reduction of the transmission delay and a 20% (or other percent) reduction of the cache (e.g., storage, memory and/or buffer) load.

In a wireless communication network (e.g., a non-terrestrial network (NTN)), a communication node (e.g., an airborne base station, a satellite or a high-altitude platform) may be far from another communication node or device (e.g., a ground terminal, a UE, a gNB, or an eNB), which can result in a prolonged round-trip time (RTT) for transmitting data and receiving feedback/information about the transmission. Preserving traditional error correction coding techniques and/or error control mechanisms (e.g., hybrid automatic repeat request (HARD), automatic repeat request (ARQ) or other mechanisms and/or techniques) and/or disabling the mechanisms and/or techniques can cause an increase in latency and/or resource (e.g., computation time, memory, bandwidth) overhead. The systems and methods presented herein include a novel data transmission and/or retransmission scheme that can utilize a condition of the data transmission and/or indicators that describe the data transmission to determine whether to retransmit the data. A first indicator can comprise at least one of a modulation and coding scheme (MCS), a repetition number (RN), a new data indicator (NDI), a redundancy version (RV), or any other value or index. A second indicator can comprise at least one of a valid time interval, a retransmission threshold, or any other constraint or information. The second indicator may be transmitted and/or received via at least one of a radio resource control (RRC) configuration, a media access control element (MAC CE), or any other configuration or message. The first indicator may be transmitted and/or received via downlink control information (DCI) or other mechanism/message, such as via a MAC CE or RRC message. The present solution can reduce transmission delay, increase system throughput (for instance by 20% or other percent), reduce signaling overhead (for instance by 20% or other percent), and can reduce the load on data storage (e.g., on memory, cache and/or buffer).

In the present solution, a wireless communication node(s) (e.g., a ground terminal, a base station, a gNB, or a eNB) can determine whether a scheduled data transmission is a retransmission based on a change in value of an indicator(s) (e.g., a MCS, a RN, or other indicators or parameters), a value of an indicator(s) (e.g., a NDI, a RV, or other indicators or parameters) and/or a comparison of a current condition of a scheduled data transmission with a condition of a most recent data transmission. For example, a wireless communication node can send or provide DCI that includes indicator(s) (e.g., MCS, RN, NDI, RV, or other indicators or parameters) to inform a wireless communication device (e.g., UE) of a scheduled downlink/uplink data and/or whether the data is to be a retransmission of the most recent data transmission. The DCI is provided by way of a non-limiting example, as any other type or form of message, configuration or information can be utilized to communicate the indicator(s) to the wireless communication device. If the data is a retransmission, soft combining (or any other method that combines or integrates data from multiple transmissions to minimize/avoid incomplete information and/or error) can be performed at the wireless communication device to obtain a combining gain.

In addition, the proposed solution can limit the number of retransmissions by determining that a retransmission count is within a retransmission threshold. When the scheduled transmission is a new transmission, the retransmission count may be cleared (or reset, e.g., to 0) and the retransmission count can then be associated with the data for the scheduled transmission.

In the present solution, a wireless communication device(s) and/or a wireless communication node(s) can determine whether a plurality of constraints are completely satisfied, so as to determine whether the scheduled transmission should be a retransmission or a new transmission. If the plurality of constraints are incompletely satisfied (e.g., if at least one of the constraints are not met or satisfied), the scheduled transmission may be transmitted or received as a new transmission. The plurality of constraints can be transmitted, received and/or communicated via an indicator (for example, a second indicator) that is indicative of or includes (e.g., describes, defines or includes) the plurality of constraints.

The plurality of constraints can include a constraint that only the data included in a most recent data transmission may be retransmitted. Hence, when determining whether the scheduled data transmission is a retransmission, only the most recently transmitted data can be considered and/or retransmitted. At least one constraint can be that a time interval $\Delta T$ between a transmit or receive time of a first data transmission (e.g., a scheduled data transmission, or a most recent data transmission) and a transmit or receive time of a second data transmission (e.g., a scheduled data transmission, or a most recent data transmission) is smaller than or equal to a valid time interval $\Delta T \le T_{valid}$, where $T_{valid}$ can represent the valid time interval. The valid time interval $T_{valid}$ between the first and second data transmission can be measured in units of seconds, frames, frame numbers, subframes, sub-frame numbers, slot numbers and/or other units. At least one constraint can be that the time interval $\Delta T_{DCI}$ between a transmit or receive time of a first DCI (e.g., a scheduled downlink and/or uplink DCI, or a most recent downlink and/or uplink DCI) and a transmit or receive time of a second DCI (e.g., a scheduled downlink and/or uplink DCI, or a most recent downlink and/or uplink DCI) is smaller than or equal to the valid time interval $\Delta T_{DCI} \le T_{valid}$, where $T_{valid}$ can represent the valid time interval. The valid time interval $T_{valid}$ between the first and second DCI can be measured in units of seconds, frames, frame numbers, subframes, sub-frame numbers, slot numbers and/or other units.

At least one constraint may include that once a modulation and coding scheme (MCS) has changed from a first scheme for the most recent data transmission to a second scheme for the scheduled data transmission, a maximum transport block (TB) size of the second scheme is larger than or equal to an actual TB size of the most recent data transmission corresponding to the first scheme. This can be to ensure that the most recent data transmitted can be completely or successfully retransmitted under the second scheme after the change in MCS. At least one constraint may include determining that a retransmission count (e.g., the number of times or repetitions that the same data has been transmitted) associated with data for the scheduled data transmission, is within a retransmission threshold (e.g., a maximum number of times or repetitions that the same data can be transmitted, for instance until retransmission is no longer allowed or supported). This can be to limit the amount of system resources being utilized to retransmit the same data, and/or can avoid holding up the transmission of new data.

Figure 3A:
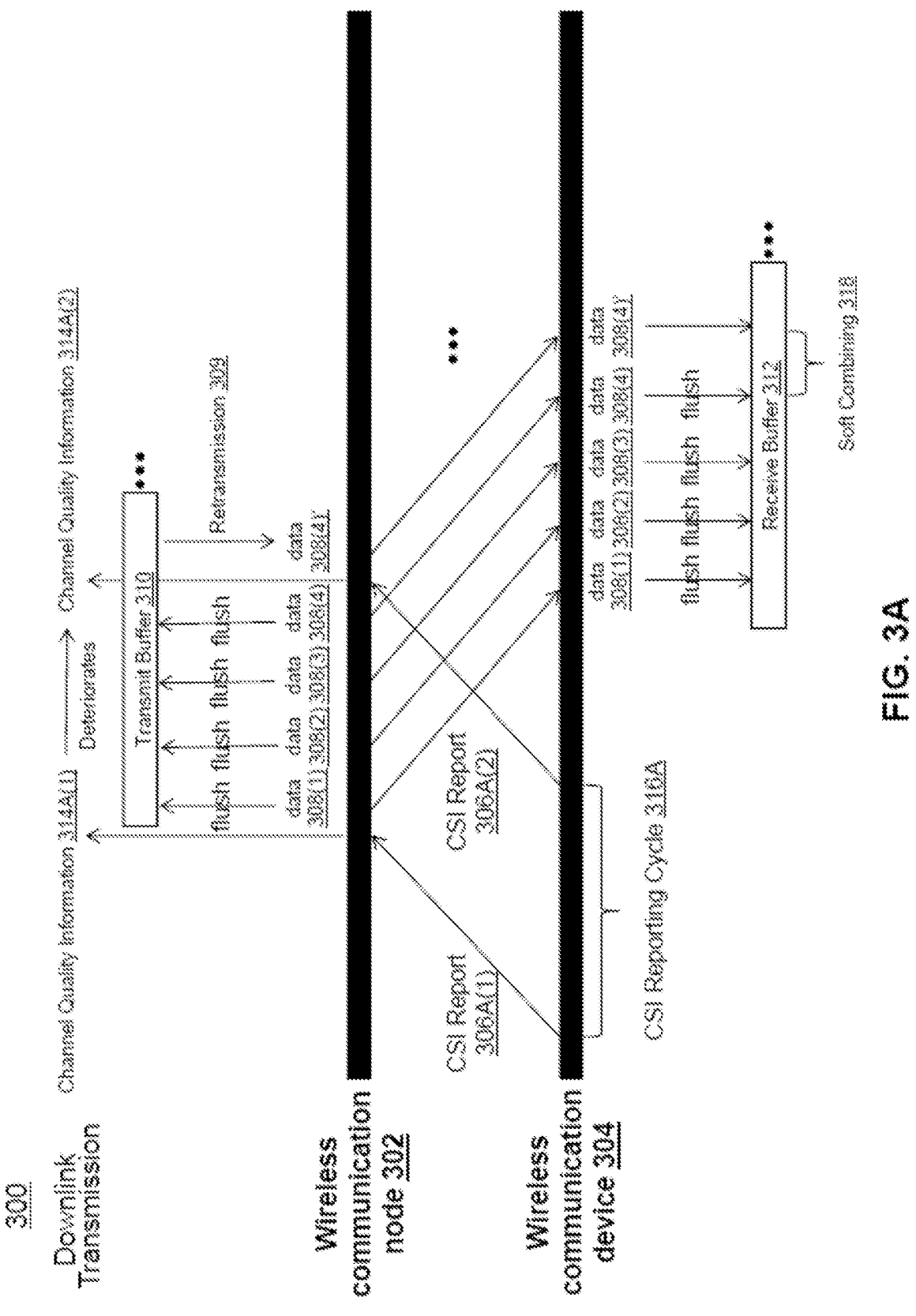
FIG. 3A illustrates a block diagram of an example system for downlink data transmission and/or retransmission.

Referring now to FIG. 3A, depicted is a block diagram of an example system 300 for downlink transmission and/or retransmission of data. Downlink transmission and/or retransmission may refer to a scenario where the wireless communication node(s) 302 transmits and/or retransmits data 308 to a wireless communication device(s) 304. In one example embodiment, after measuring, considering, detecting and/or determining the condition of a data transmission and/or its transmission channel (e.g., a channel state and/or channel condition), the wireless communication device 304 (e.g., a UE) can send or transmit a report, such as a channel state information (CST) report 306A, to the wireless communication node 302. The CSI report 306A can include indicators (e.g., information, and/or parameters) that describe the condition, qualities and/or properties of a channel (e.g., information describing signal propagation, scattering, and/or fading). The CSI report 306A is referenced herein merely as a non-limiting example of a report; any other types or forms of report can be utilized to communicate the condition, properties and/or qualities of a channel and/or a data transmission.

After receiving the CSI report 306A (or any other type of report), the wireless communication node 302 may schedule a downlink data 308 transmission according to the information reported or included in the CSI report 306A. When the wireless communication node 302 schedules the downlink data 308 for transmission, the wireless communication node 302 may compare the current condition for transmission 314A(2) (of the scheduled downlink data 308) with the condition of a most recent transmission 314A(1), When the condition (e.g., of the channel) has deteriorated since the most recent transmission 314A(1), the MCS (or other indicator) may decrease from a first value to a second value (e.g., from a first MCS level or scheme, to a second MCS level or scheme). If the MCS decreases in value, and the retransmission count is within the retransmission threshold for instance, the wireless communication node 302 may determine to retransmit 309 the data 308(4)' instead of performing a new transmission of new data. The wireless communication node 302 may utilize the DCI (or any other communication or information) to indicate or communicate that the scheduled data 308(4)' is a retransmission. For instance, the wireless communication node 302 may incorporate into the DCI a first indicator which is indicative of whether the data 308 is scheduled as a retransmission or a new transmission. The wireless communication node 302 may increase the retransmission count (e.g., a first transmission count maintained/managed by the wireless communication node 302) by one, in response to determining that the scheduled data 308(4)' is a retransmission and/or transmitting the scheduled data 308(4)' as a retransmission. The wireless communication device 304 may increase the retransmission count (e.g., a second transmission count maintained/managed by the wireless communication device 304) by one, in response to determining that the scheduled data 308(4)' is a retransmission and/or receiving the scheduled data 308(4)' as a retransmission. In some embodiments, an independent retransmission count is maintained/managed at each of the wireless communication node and the wireless communication device. In certain embodiments, a single retransmission count is maintained/managed/shared/accessed by the wireless communication node or the wireless communication device, or by both the wireless communication node and the wireless communication device. The wireless communication device 304 may receive the retransmitted data 308(4)', and can perform and/or apply soft combining 318 (or any other method of combining, merging, error-correction and/or reconstruction) between versions of data received from multiple attempted transmissions (including retransmission(s)) of the same data.

It may occur that a plurality of constraints, comprising at least one of a retransmission threshold or a valid time interval, are incompletely satisfied for a scheduled data transmission. For example, the MCS may decrease but the retransmission count would reach or exceed (and thus cannot satisfy) the retransmission threshold, or a CSI reporting cycle 316A may yet to be reached to provide an updated channel condition for comparison. When the plurality of constraints are incompletely satisfied, the wireless communication node 302 may (determine to) send and/or transmit the data 308 as a new transmission 308(1-4). The wireless communication node 302 may clear the retransmission count (e.g., a first transmission count maintained/managed by the wireless communication node 302) to zero, responsive to the determination and/or the new transmission. The wireless communication device 304 may clear the retransmission count (e.g., a second transmission count maintained/managed by the wireless communication device 304) to zero, responsive to receiving and/or determining the new transmission The wireless communication node 302 may utilize the DCI for example (e.g., the first indicator in the DCI), to indicate or communicate that the data 308 is scheduled as a new transmission. When the constraints are incompletely satisfied (e.g., when a retransmission count maintained/ managed at the wireless communication device has reached its maximum value), the wireless communication device may determine the received data as a new transmission, regardless of (the value or change in value of) the first indicator in the DCI.

Regardless of whether the transmission of the data 308 is a retransmission or a new transmission, both the wireless communication node 302 and the wireless communication device 304 may store or maintain the data 308 in a transmit buffer 310 and/or a receive buffer 312. If the data 308 transmission is a new transmission, only the most recently transmitted data 308 may be stored or maintained in the transmit buffer 310) and/or the receive buffer 312. If the data 308 transmission is a retransmission, only the most recently transmitted data 308 may be stored or maintained in the transmit buffer 310. The data 308 that has undergone soft combining can be stored or maintained in the receive buffer 312.

Figure 3B:
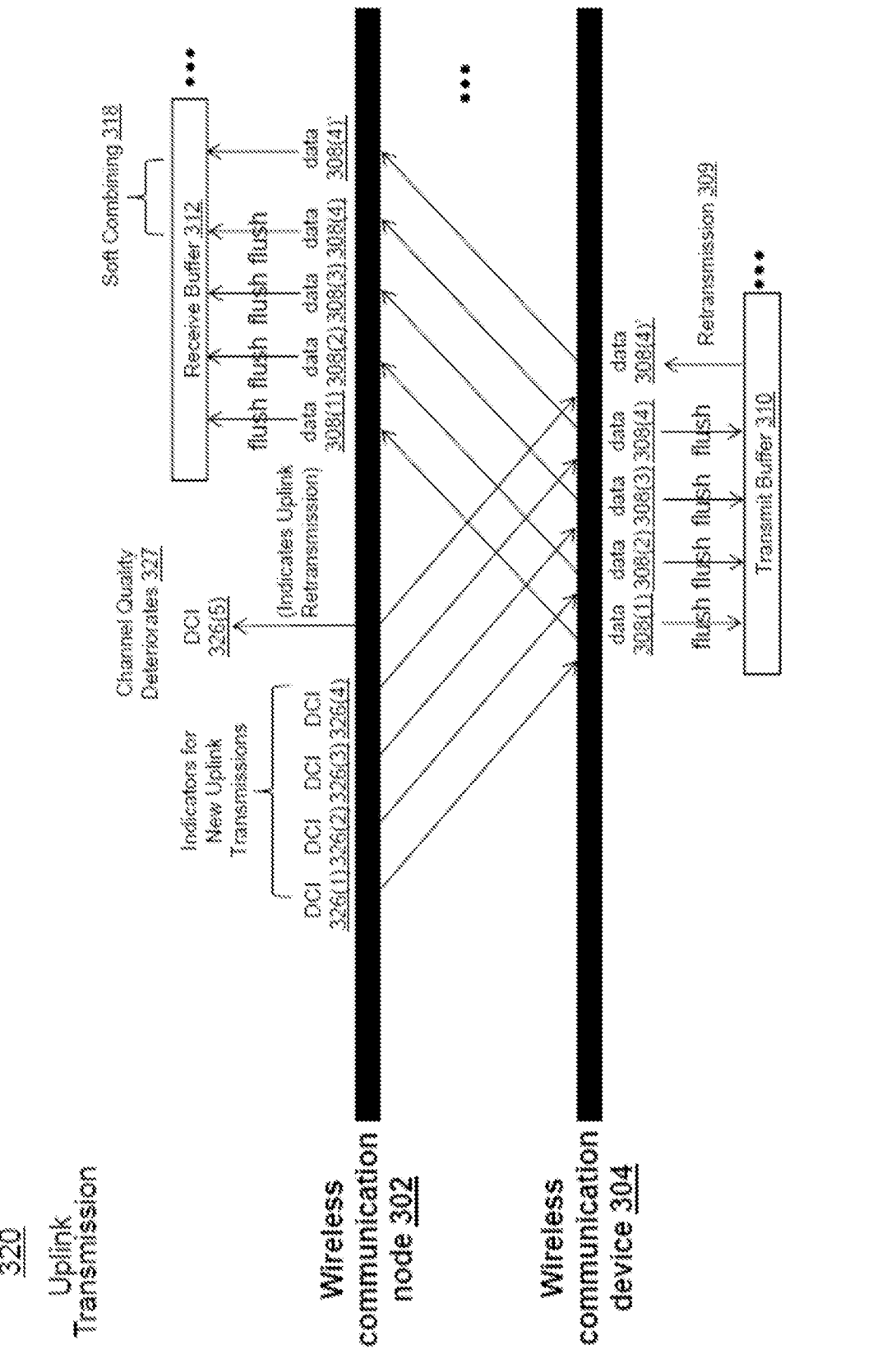
FIG. 3B illustrates a block diagram of an example system for uplink data transmission and/or retransmission.

Referring now to FIG. 3B, depicted is a block diagram of an example system 320 for uplink transmission and/or retransmission of data. Uplink transmission and/or retransmission may refer to a scenario where a wireless communication device 304 transmits and/or retransmits data 308 to a wireless communication node(s) 302. In one example embodiment, the wireless communication node 302 may measure, detect or determine the condition of a scheduled transmission and/or its channel (e.g., a channel quality, state and/or condition). The wireless communication node 302 may determine uplink scheduling information (e.g., indicators and/or parameters that describe the qualities and/or properties of a channel(s)), according to the condition of the transmission. The wireless communication node 302 may utilize a DCI 326 (or any other message) to communicate the uplink scheduling information (e.g., first indicator) to the wireless communication device 304. The wireless communication device 304 may receive the DCI 326 sent and/or transmitted by the wireless communication node 302. The wireless communication device 304 may obtain or extract the uplink scheduling information (e.g., first indicator) from the DCI 326. The uplink scheduling information may be indicative of whether a scheduled data transmission is a retransmission or a new transmission If the condition of the transmission deteriorates 327, the MCS may decrease from a first value to a second value. If the MCS decreases in value, and the retransmission count is within the retransmission threshold for instance, the wireless communication node 302 may indicate to the wireless communication device 304 to transmit the scheduled uplink data 308(4)' as a retransmission 309. The wireless communication node 302 may utilize (a first indicator in) the DCI 326(5) to indicate to the wireless communication device 304 to retransmit the data 308(4)'. The wireless communication node 302 may increase the retransmission count by one. The wireless communication node 302 may receive the retransmitted data 308(4)' and can perform and/or apply soft combining 318 (or any other method of combining, merging, error-correction and/or reconstruction) between versions of data received from multiple attempted transmissions (including retransmission(s)) of the same data.

It may occur that a plurality of constraints, comprising at least one of a retransmission threshold or a valid time interval, are incompletely satisfied during a transmission. For example, the MCS (or any other indicator) may increase or remain equal and/or the MCS (or any other indicator) may decrease but the retransmission count exceeds (and thus fails to satisfy the constraint corresponding to) the retransmission threshold. When the plurality of constraints are incompletely satisfied (e.g., at least one of the constraints are not met or satisfied), the wireless communication node 302 may indicate to the wireless communication device 304 to transmit the uplink data 308 as a new transmission 308(1-4). The wireless communication device 304 may send or transmit the uplink data 308 as a new transmission 308(1-4) according to the corresponding DCI 326 (e.g., via a first indicator) and/or the plurality of constraints (e.g., via a second indicator). The wireless communication node 302 may clear the retransmission count (e.g., a first retransmission count maintained/managed at the wireless communication node) for the uplink data 308 to zero, corresponding to the new transmission. The wireless communication device 304 may clear the retransmission count (e.g., a second retransmission count maintained/managed at the wireless communication device) for the uplink data 308 to zero, corresponding to the new transmission.

Regardless of whether the transmission is a retransmission or a new transmission, both the wireless communication node 302 and the wireless communication device 302 may store or maintain the data 308 in a transmit buffer 310 and/or a receive buffer 312. If the data 308 transmission is a new transmission, only the most recently transmitted data 308 may be stored or maintained in the transmit buffer 310 and/or the receive buffer 312. If the data 308 transmission is a retransmission, only the most recently transmitted data 308 may be stored or maintained in the transmit buffer 310. The data 308 that has undergone soft combining can be stored or maintained in the receive buffer 312.

In some embodiments, specification(s) for wireless communications can describe and/or specify format(s) and/or structure(s) for the DCI. The DCI (or other information or communication) may be utilized to schedule uplink and/or downlink data transmissions. Current DCI format(s) and/or structure(s) can include HARQ (or any other acknowledgement mechanism's) related fields, such as a new data indicator (NDI), a redundancy version (RV), a HARQ process number(s), and/or other fields. The NDI can indicate and/or specify whether the current HARQ process is related to a new data transmission. The RV can indicate and/or specify the current redundancy version number. The HARQ process number(s) can indicate and/or specify the current HARQ process number(s). If the HARQ function is disabled and/or deactivated, the HARQ-related fields included in the DCI may be utilized to indicate and/or specify information unrelated to the HARQ function. For instance, the NDI and/or RV fields in the DCI may be utilized or (re)configured as retransmission and/or redundant version indicators for the present solution. The modulation and coding scheme (MCS) field in the DCI may be related to the condition of the data transmission or its channel (e.g., a channel quality, state and/or condition). Therefore, a change in value of the MCS (or other indicator) may be utilized to indicate whether the scheduled data transmission is a retransmission. If the HARQ functionality is disabled or enabled, the MCS may be included in the DCI as an indicator to indicate whether scheduled data transmission is a retransmission, or a new transmission for new data.

For Long Term Evolution (LTE), Narrow Band Internet of Things (NB-IoT), and New Radio (NR), the format(s) and/or structure(s) for the DCI can differ. For example, in the case of LTE and NR, when the HARQ function is disabled, the DCI may exclude the HARQ process number field. When the data transmission supports more than one codeword, the transport blocks (TBs) contained in the different codewords can correspond to independent MCS, NM, and/or RV values in the respective DCI (e.g., the DCI for the data transmission can include multiple MCS values, each MCS value corresponding to a particular TB and codeword). Codewords may correspond to separate streams of data that include information to be sent through a channel, and each stream of data may be associated with a specific set of MCS, NDI and/or RV values. Therefore, the MCS, NDI and/or RV values (from the DCI) corresponding/specific to a particular TB can be used to indicate whether to retransmit that particular TB.

For NB-IoT, the DCI can include the HARQ process number field when at least two HARQ processes are configured by a higher layer (e.g., RRC). If only one HARQ process is configured by the higher layer, the HARQ process number may be excluded from the DCI. After the HARQ function is disabled and/or deactivated, the HARQ process number field may be excluded from the DCI (e.g., may no longer exist in the DCI).

The NB-IoT DCI format may comprise a repetition number (RN) field of the corresponding physical downlink shared channel (PDSCH) and/or physical uplink shared control channel (PUSCH), to include a RN value. The RN (or RN value) may indicate that the resources occupied by the currently scheduled PDSCH and/or PUSCH are repeated at least a certain number of times in the time domain. The RN may be dynamically configured, and can reflect the condition of a data transmission (e.g., a quality of a corresponding channel) A larger RN can indicate that the condition of a data transmission has deteriorated. A smaller RN can indicate that the condition of a data transmission has improved. Therefore, a change in value of the RN can indicate whether the scheduled data transmission is a retransmission.

As previously mentioned, if the HARQ function is disabled and/or deactivated, some HARQ-related fields included in the DCI may be reconfigured and/or utilized to specify information unrelated to the HARQ function. One or more of the following scenarios may occur as a result of disabling the HARQ function.

A. Retransmission Indicators Where NDI and RV are Included in the DCI

For LTE, NR, and/or NB-IoT, if NDI and RV are included in the DCI, the value and/or change in value of NDI, RV, and/or MCS can indicate whether a scheduled data transmission is a retransmission. For NB-IoT, the RN included in the DCI can indicate whether a scheduled data transmission is a retransmission. If the NDI and/or RV are used as retransmission indicator(s) and the plurality of constraints are completely satisfied, a retransmission or a new transmission may be indicated according to any of the following approaches:

For the NDI, a value of '0' (or '1') may indicate a retransmission, and a value of '1' (or '0') may indicate a new transmission.
 For the RV, a value of '0' may indicate a new transmission. Other values may indicate a retransmission.

If the plurality of constraints are incompletely satisfied (e.g., if at least one of the constraints are not met or satisfied), the scheduled data transmission is a new transmission regardless of the value and/or change in value of the NDI, RV, and/or MCS indicators. If the MCS is utilized as an indicator and the plurality of constraints are completely satisfied, a change in value of the MCS may indicate retransmission. If the MCS decreases (for instance by one or more levels, or other value), the scheduled data transmission may be a retransmission. If the MCS increases (for instance by one or more levels, or other value) or remains the same or unchanged, the scheduled data transmission may be a new transmission. For LTE and/or NR, if at least more than one TB is transmitted simultaneously, the NDI, RV, and/or MCS values corresponding to each TB in the DCI can be used or configured as retransmission indicator(s) for the corresponding TB.

For NB-IoT, the RN can be a retransmission indicator. If the RN is used as an indicator and the plurality of constraints are completely satisfied, a change in value of the RN may indicate a retransmission. If the RN increases (for instance by 20% or other value), the scheduled data transmission can be a retransmission. If the RN decreases (for instance by 20% or other value) or remains the same or unchanged, the scheduled data transmission can be a new transmission. If the plurality of constraints are incompletely satisfied, the scheduled data transmission is a new transmission regardless of the value and/or change in value of the RN.

B. Retransmission Indicators when NDI is included in the DCI

For LTE, NR, and/or NB-IoT, if the NDI is included in the DCI, the value and/or change in value of NDI and/or MCS can indicate whether a scheduled data transmission is a retransmission. For NB-IoT, the RN included in the DCI can indicate whether a scheduled data transmission is a retransmission. If the NDI is used as a retransmission indicator and the plurality of constraints are completely satisfied, a retransmission or a new transmission may be indicated as follows:

For the NDI, a value of '0' (or '1') may indicate a retransmission and a value of '1' (or '0') may indicate a new transmission.

If the plurality of constraints are incompletely satisfied (e.g., if at least one of the constraints are not met or satisfied), the scheduled data transmission is a new transmission regardless of the value and/or change in value of the NDI and/or MCS indicators. If the MCS is utilized as an indicator and the plurality of constraints are completely satisfied, a change in value of the MCS may indicate whether a scheduled data transmission is a retransmission. If the MCS decreases (for instance by one or more levels, or other value), the scheduled data transmission can be a retransmission. If the MCS increases (for instance by one or more levels, or other value) or remains the same or unchanged, the scheduled data transmission may be a new transmission. For LTE and/or NR, if at least one TB is transmitted simultaneously in a transmission, corresponding NDI and/or MCS values for each TB (included in the DCI) may be used as retransmission indicator(s) for the corresponding TB.

For NB-IoT, the RN can be a retransmission indicator. If the RN is used as an indicator and the plurality of constraints are completely satisfied, a change in value of the RN can indicate a retransmission. If the RN increases (for instance by 20% or other value), the scheduled data transmission can be a retransmission. If the RN decreases (for instance by 20% or other value) or remains the same or unchanged, the scheduled data transmission can be a new transmission. If the plurality of constraints are incompletely satisfied, the scheduled data transmission is a new transmission regardless of the value and/or change in value of the RN.

C. Retransmission Indicators When the RV is Included in the DCI

For LTE, NR, and/or NB-IoT, if the RV is included in the DCI, the value and/or change in value of the RV and/or MCS can indicate whether a scheduled data transmission is a retransmission. For NB-IoT, the RN included in the DCI can indicate whether a scheduled data transmission is a retransmission. If the RV is used as retransmission indicator(s) and the plurality of constraints are completely satisfied, a retransmission or a new transmission may be indicated as follows:

For the RV, a value of '0' may indicate a new transmission. Other values may indicate a retransmission.

If the plurality of constraints are incompletely satisfied (e.g., if at least one of the constraints are not met or satisfied), the scheduled data transmission is a new transmission regardless of the value and/or change in value of the RV and/or MCS indicators. If the MCS is utilized as an indicator and the plurality of constraints are completely satisfied, a change in value of the MCS may indicate a retransmission. If the MCS decreases (for instance by 20% or other value), the scheduled data transmission can be a retransmission. If the MCS increases (for instance by 20% or other value) or remains the same, the scheduled data transmission may be a new transmission. For LTE and/or NR, if at least more than one TB is transmitted simultaneously, the RV (corresponding to each TB) included in the DCI can be a retransmission indicator of the corresponding TB. The MCS values (corresponding to each TB) included in the DCI can be a retransmission indicator for the corresponding TB.

For NB-IoT, the RN can be a retransmission indicator. If the RN is used as an indicator and the plurality of constraints are completely satisfied, a change in value of the RN can indicate a retransmission. If the RN increases (for instance by 20% or other value), the scheduled data transmission can be a retransmission. If the RN decreases (for instance by 20% or other value) or remains the same, the scheduled data transmission can be a new transmission. If the plurality of constraints are incompletely satisfied, the scheduled data transmission is a new transmission regardless of the value and/or change in value of the RN.

D. Retransmission Indicators if the NDI and RV are Excluded from the DCI

For LTE, NR, and/or NB-IoT, if the NDI and RV are excluded from the DCI for instance, the change in value of the MCS can indicate whether a scheduled data transmission is a retransmission. For NB-IoT, the RN included in the DCI can indicate whether a scheduled data transmission is a retransmission.

If the plurality of constraints are incompletely satisfied (e.g., if at least one of the constraints are not met or satisfied), the scheduled data transmission is a new transmission regardless of the change in value of the MCS. If MCS is utilized as an indicator and the plurality of constraints are completely satisfied, a change in value of the MCS may indicate a retransmission. For example, if the MCS decreases (for instance one or more levels, or other value), the scheduled data transmission can be a retransmission. If the MCS increases (for instance by one or more levels, or other percent) or remains the same, the scheduled data transmission may be a new transmission. For LTE and/or NR, if at least more than one TB is transmitted simultaneously, the MCS value (corresponding to each TB) included in the DCI can be a retransmission indicator for the corresponding TB.

For NB-IoT, the RN can be a retransmission indicator. If the RN is used as an indicator and the plurality of constraints are completely satisfied, a change in value of the RN can indicate a retransmission. If the RN increases (for instance by 20% or other value), the scheduled data transmission can be a retransmission. If the RN decreases (for instance by 20% or other value) or remains the same, the scheduled data transmission can be a new transmission. If the plurality of constraints are incompletely satisfied, the scheduled data transmission is a new transmission regardless of the value and/or change in value of the RN.

E. Constraint: The Time Interval Between Transmitting or Receiving Data Transmissions The time interval between a transmit or receive time of a first data transmission (e.g., a most recent uplink or downlink data transmission, or a scheduled uplink or downlink data transmission), and a transmit or receive time of a second data transmission (e.g., a scheduled uplink or downlink data transmission, or a most recent uplink or downlink data transmission), $\Delta T$, may be defined and/or measured in a number of ways. In one example embodiment, $\Delta T$ may be the difference between a start time of a first subframe in the first data transmission and the start time of the first subframe in the second data transmission. In another example embodiment, $\Delta T$ may be the difference between an end time of a last subframe in the first data transmission and the end time of the last subframe in the second data transmission.

The valid time interval $T_{valid}$ may be the maximum allowable value for $\Delta T$ (e.g., a constraint to be met) before the retransmission indicators (e.g., MCS, NDI, RN, RV, or any other indicator(s)) may be considered in a determination of whether a scheduled data transmission is a retransmission or a new data transmission. The valid time interval $T_{valid}$ may be configured by a higher layer (e.g., RRC). The wireless communication node and the wireless communication device may share and/or have access to the valid time interval $T_{valid}$. The wireless communication node may configure and/or determine the value of the valid time interval $T_{valid}$. In one embodiment, the wireless communication node may determine that the valid time interval $T_{valid}$ should be less than the minimum value between the round-trip time (RTT) and/or the channel coherence time ($\tau$) (e.g., $T_{valid} < \min\{RTT, \tau\}$).

When $\Delta T$ is larger than the valid time interval $T_{valid}$ (e.g., $\Delta T > T_{valid}$, when the valid time interval constraint is not met), the scheduled data transmission may be sent and/or transmitted as a new transmission regardless of the value and/or change in value of the indicators included in the DCI. When $\Delta T$ is smaller than or equal to the valid time interval $T_{valid}$ (e.g., $\Delta T < T_{valid}$, when the valid time interval constraint is met), the scheduled data transmission may be sent and/or transmitted as a new transmission or retransmission according to the value and/or change in value of the indicators included in the DCI. For LTE and/or NR, if more than one TB is transmitted simultaneously, the valid time interval $T_{valid}$ corresponding to each TB can be shared and/or configured separately (e.g., between the wireless communication node and the wireless communication device).

F. Constraint: Time Interval Between DCIs

The time interval between a transmit or receive time of a first DCI (e.g., a DCI corresponding to a most recent uplink or downlink data transmission, or a DCI corresponding to a scheduled uplink or downlink data transmission) and a transmit or receive time of a second DCI (e.g., a DCI corresponding to a scheduled uplink or downlink data transmission, or a DCI corresponding to a most recent uplink and/or downlink data transmission), $\Delta T_{DCI}$, may be defined and/or measured in a number of ways. In one example embodiment, $\Delta T_{DCI}$ may be the difference between a start time of a first subframe in the first DCI and the start time of the first subframe in the second DCI. In another example embodiment, the time interval $\Delta T_{DCI}$ may be the difference between an end time of a last subframe in the first DCI and the end time of the last subframe in the second DCI.

The valid time interval $T_{valid}$ may be the maximum allowable value for $\Delta T_{DCI}$ (e.g., as a constraint to be met)

before the retransmission indicators (e.g., MCS, NDI, RN, RV, or any other indicator(s)) can be considered in the determination of whether a scheduled data transmission is a retransmission of previous data or a new transmission of new data. The valid time interval $T_{valid}$ may be configured and/or determined by a higher layer (e.g., RRC). The wireless communication node and the wireless communication device may share and/or have access to the valid time interval $T_{valid}$. The wireless communication node may configure and/or determine the value of the valid time interval $T_{valid}$. In one embodiment, the wireless communication node may determine that the valid time interval $T_{valid}$ should be less than the minimum value between the round-trip time (RTT) and/or the channel coherence time ($\tau$) (e.g., $T_{valid} < \min\{RTT, \tau\}$).

When $\Delta T_{DCI}$ is larger than the valid time interval $T_{valid}$ (e.g., $\Delta T_{DCI} > T_{valid}$, so that the valid time interval constraint is not met), the scheduled data transmission may be sent and/or transmitted as a new transmission regardless of the value and/or change in value of the indicators included in the DCI. When $\Delta T_{DCI}$ is smaller than or equal to the valid time interval $T_{valid}$ (e.g., $\Delta T_{DCI} \leq T_{valid}$, so that the valid time interval constraint is met), the scheduled data transmission may be sent and/or transmitted as a new transmission or retransmission according to the value and/or change in value of the indicators included in the DCI. For LTE and/or NR, if more than one TB is transmitted simultaneously, the valid time interval $T_{valid}$ corresponding to each TB can be shared and/or configured separately (e.g., between the wireless communication node and the wireless communication device).

G. Constraint: Resource Allocation Issues and Changes to the MCS

In some embodiments, the MCS can change from a first value and/or scheme to a second value and/or scheme. If the MCS decreases in value/level, a maximum transport block (TB) size corresponding to the second scheme should be larger than or equal to an actual TB size corresponding to the first scheme, without exceeding the maximum code rate, to ensure that the most recent data transmission can be completely or successfully retransmitted under the second scheme after the change in MCS. Otherwise, the retransmission may only be able to carry a part of the data transmitted under the first scheme, instead of completely retransmitting the data. In the latter case, a first indicator (e.g., comprising the MCS and/or TB information) should be interpreted as an indication that retransmission is not supported, and that the scheduled data transmission is a new transmission.

The wireless communication device may receive the MCS and/or TB information included in the DCI. Responsive to receiving this information (or first indicator), the wireless communication device may for instance determine that the maximum TB size of the scheduled uplink or downlink data is larger or equal to the actual TB size of the most recent uplink downlink data. In such a situation, if the constraints for retransmission are also completely satisfied, the wireless communication device may determine that the scheduled data transmission is a retransmission. If the constraints for retransmission are incompletely satisfied (e.g., if at least one of the constraints are not met or satisfied), the wireless communication device may determine that the scheduled data transmission is a new transmission.

For LTE and/or NR, if more than one TB is transmitted simultaneously (e.g., in one transmission), the maximum data size for each TB in the scheduled data transmission may be compared to the actual data size of the corresponding TB in the most recent data transmission. The retransmission indicator (e.g., comprising the abovementioned TB related information) corresponding to each TB can be interpreted or evaluated separately, in determining whether the transmission of the corresponding TB is a retransmission or a new transmission.

H. Constraint: Maximum Number of Retransmissions

At least one constraint may include determining that a retransmission count (e.g., the number of times or repetitions that the same data has been transmitted) associated with data for the scheduled data transmission, is within a retransmission threshold (e.g., a maximum number of times or repetitions that the same data can be transmitted, for instance until retransmission is no longer allowed or supported). This can be to limit the amount of system resources being utilized to retransmit the same data, and/or can avoid holding up the transmission of new data. In some embodiments, the retransmission count may be configured by a higher layer (e.g., RRC). The wireless communication device and the wireless communication node may share, manage, maintain, update and/or have access to the retransmission count. In some embodiments, the wireless communication device and the wireless communication node may each hold/maintain/manage an independent or separate retransmission count. If the scheduled (or current) data transmission is a retransmission of the most recent data transmission, the retransmission count may increase by a value of one. If the scheduled (or current) data transmission is a new transmission, the retransmission count may be cleared (or reset, e.g., to 0). The retransmission count may be associated with the most recently transmitted data, and can be cleared (or reset, e.g., to 0) when the scheduled data is a new transmission, and then becomes associated with this scheduled data.

If the retransmission count does not exceed the retransmission threshold (e.g., the retransmission threshold constraint is met), the retransmission indicators (e.g., MCS, NDI, RV, and/or RN) included in the DCI may then be interpreted accordingly, and the scheduled data can be sent or transmitted as a retransmission or a new transmission. If the retransmission count exceeds the retransmission threshold (e.g., the retransmission threshold constraint is not met), the scheduled data may be sent as a new transmission, regardless of the value and/or change in value of the retransmission indicators.

For LTE/NR, when the number of simultaneously transmitted TBs is greater than 1, the maximum number of retransmissions (e.g., retransmission threshold) corresponding to each TB can be shared or configured separately, as a constraint for retransmission of the corresponding TB. The number of retransmissions corresponding to each TB should be counted and/or maintained separately, and can be compared against the corresponding TB's retransmission threshold.

I. Constraint: Reference for determining whether to Retransmit Data

In some embodiments, the wireless communication node may utilize a most recent (or another previously scheduled) data transmission as a reference (or baseline for comparison) to determine whether a scheduled data transmission is a retransmission. By default, the reference used by the wireless communication node to determine whether a scheduled data transmission is a retransmission, is the last most recently) scheduled data transmission. The wireless communication node may determine whether a scheduled data transmission is a retransmission by comparing the condition (e.g., a channel state and/or channel condition) of the scheduled/current data transmission, to the condition of the most recent data transmission (e.g., the reference or most recent data transmission). For example, the wireless communication node determines whether it is a retransmission by comparing the current channel quality (of the scheduled data transmission) with the channel quality of the previously scheduled data transmission (e.g., as the reference). If the plurality of constraints are completely satisfied, the scheduled data transmission may be a retransmission or a new transmission (e.g., according to a result of the comparison of the conditions). If the plurality of constraints are incompletely satisfied (e.g., if at least one of the constraints are not met or satisfied), the scheduled data transmission may be a new transmission (e.g., regardless of the result of the comparison of the conditions).

Figure 4:
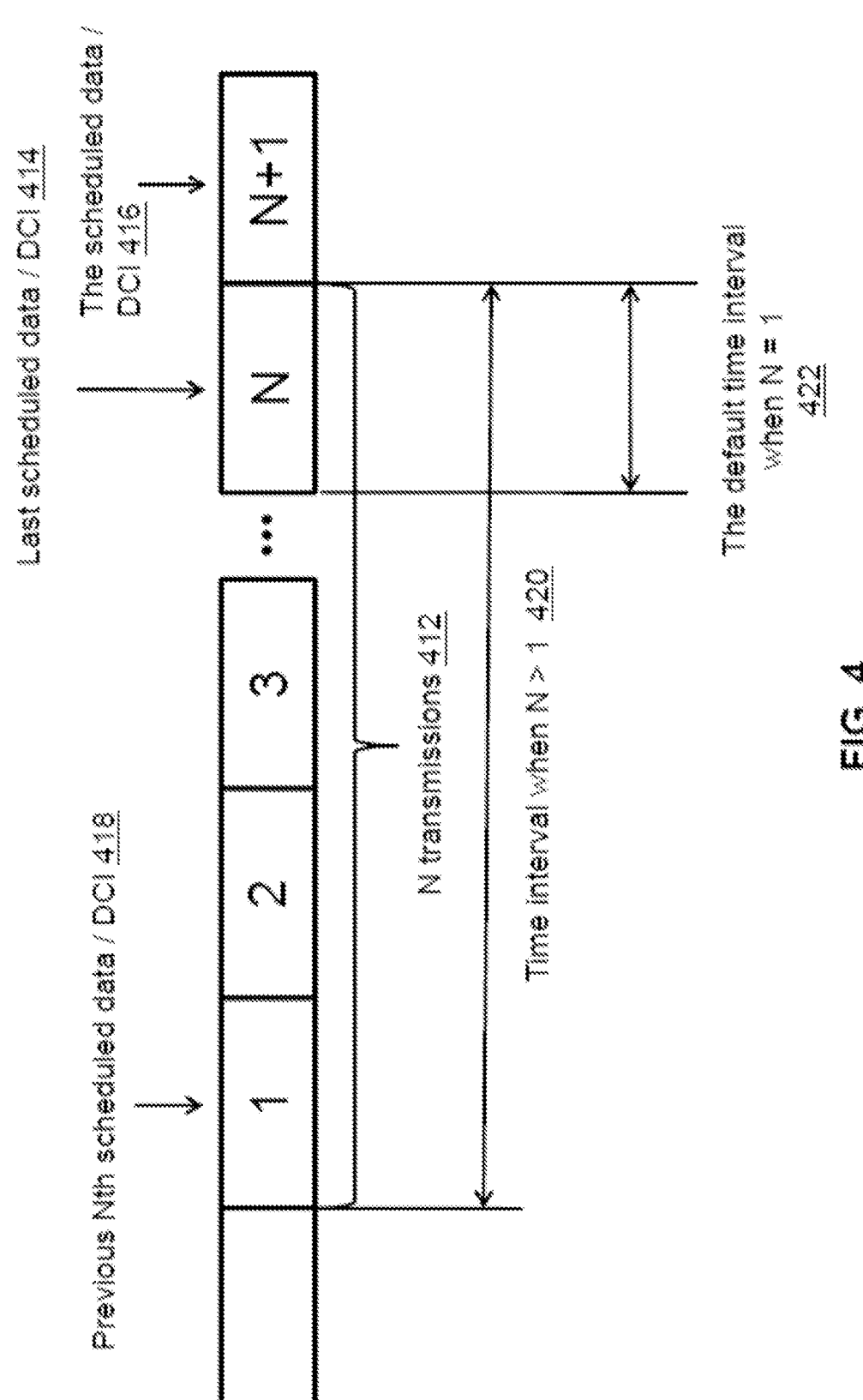
FIG. 4 illustrates a block diagram of an example system where a number of data or DCI transmissions is configured, in accordance with an embodiment of the present disclosure.

Referring now to FIG. 4, depicted is a block diagram of an example system where a retransmission interval, N, may be configured. In some embodiments, the wireless communication node 302 may configure a retransmission interval, N, (e.g., N data transmissions from a data retransmission to the initial data transmission, and/or N DCI transmissions from a DCI transmission for a data retransmission scheduling to the DCI transmission for the initial data transmission scheduling), where N may be larger than one (e.g., N>1). The wireless communication node 302 may configure a retransmission interval, N, as a specific number (N) of data/DCI transmissions (some of which may be of a different length of time than others). In some embodiments, if N>1, "the most recent data transmission" (or "the previously scheduled data transmission"), in the preceding text can be replaced, substituted, or exchanged with "the Nth most recent data transmission" (or "the Nth previously/prior scheduled data transmission"). Before the current data and/or DCI transmission is completed, the wireless communication node(s) 302 and/or device(s) 304 may store or maintain data and/or DCIs from the previous (or N previous) data and/or DCI transmission(s) in the transmit and/or receive buffer(s) (e.g., the N previous transmission(s) 412, up to the most recent transmission, may be stored in the buffer(s)). In some embodiments, once the scheduled data transmission 416 is complete, the transmit and/or receive buffer(s) may store or maintain the scheduled/current data and/or DCI 416, and can delete or erase the data and/or DCIs from the Nth previous transmission 412 (e.g., the Nth transmission prior to the scheduled transmission may be deleted or erased from the buffer(s)).

In some embodiments, the retransmission interval, N, can be a constraint. The wireless communication device/node can determine if the number of data transmissions have exceeded N. If the number of data transmissions has not exceeded N, the wireless communication device/node can determine that any of these data transmissions would be a new transmission. If the number of data transmissions has exceeded N, the wireless communication device/node can determine whether a scheduled data transmissions (after the first N transmissions) is a retransmission or a new transmission. For example if N=4, there is no N-th previous transmission for each of the first 4 transmissions (1st to 4th transmissions), thus the wireless communication device/node shall determine that the first 4 transmissions are each a new transmission, as the Nth most recent data transmission would not have existed at the time these transmissions are scheduled. It is after/when the scheduled number of transmissions exceeds 4, that a "Nth most recent data transmission" can exist, and accordingly, the wireless communication device/node can determine whether a scheduled data transmission (after the first 4 transmissions) is a retransmission or not.

Referring now to FIG. 4, a time interval $\Delta T$ or $\Delta T_{DCI}$ may be measured and/or determined in different ways, depending on the value of N for instance. In some embodiments, when N>1, the time interval 420 may be measured from the first data and/or DCI transmission to the Nth data and/or DCI transmission. In some embodiments, when N=1, the time interval 422 may be measured from the Nth data or DCI transmission to the (N+1)th data or DCI transmission. The time interval between transmissions may be measured in units of seconds, frames, frame numbers, sub-frames, sub-frame numbers, slot numbers and/or other units. The start and/or end time of the frame and/or subframe may be utilized to measure and/or determine the time interval.

Figure 5:
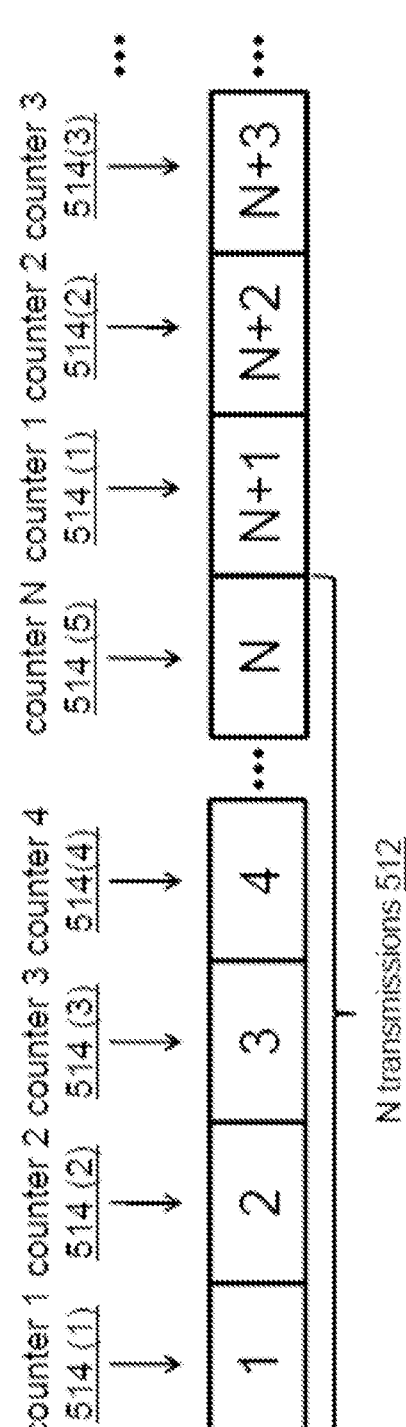
FIG. 5 illustrates a block diagram of an example system with a plurality of retransmission counters, in accordance with an embodiment of the present disclosure.

Referring now to FIG. 5, depicted is a block diagram of an example system where there are N retransmission counters. When N>1, there may be N retransmission counters 514 for the scheduled data transmissions. The N retransmission counters 514 may correspond to the N consecutive scheduled data transmissions. In some embodiments, the (N+1)th transmission and the first transmission may correspond to or utilize the same retransmission counter 514(1). In some embodiment, the (N+2)th transmission and the second transmission may correspond to or utilize the same retransmission counter 514(2). Such a pattern of corresponding retransmission counters may continue, such that the (N+Y) th transmission and the Yth transmission may correspond to or utilize the same retransmission counter.

Figure 6:
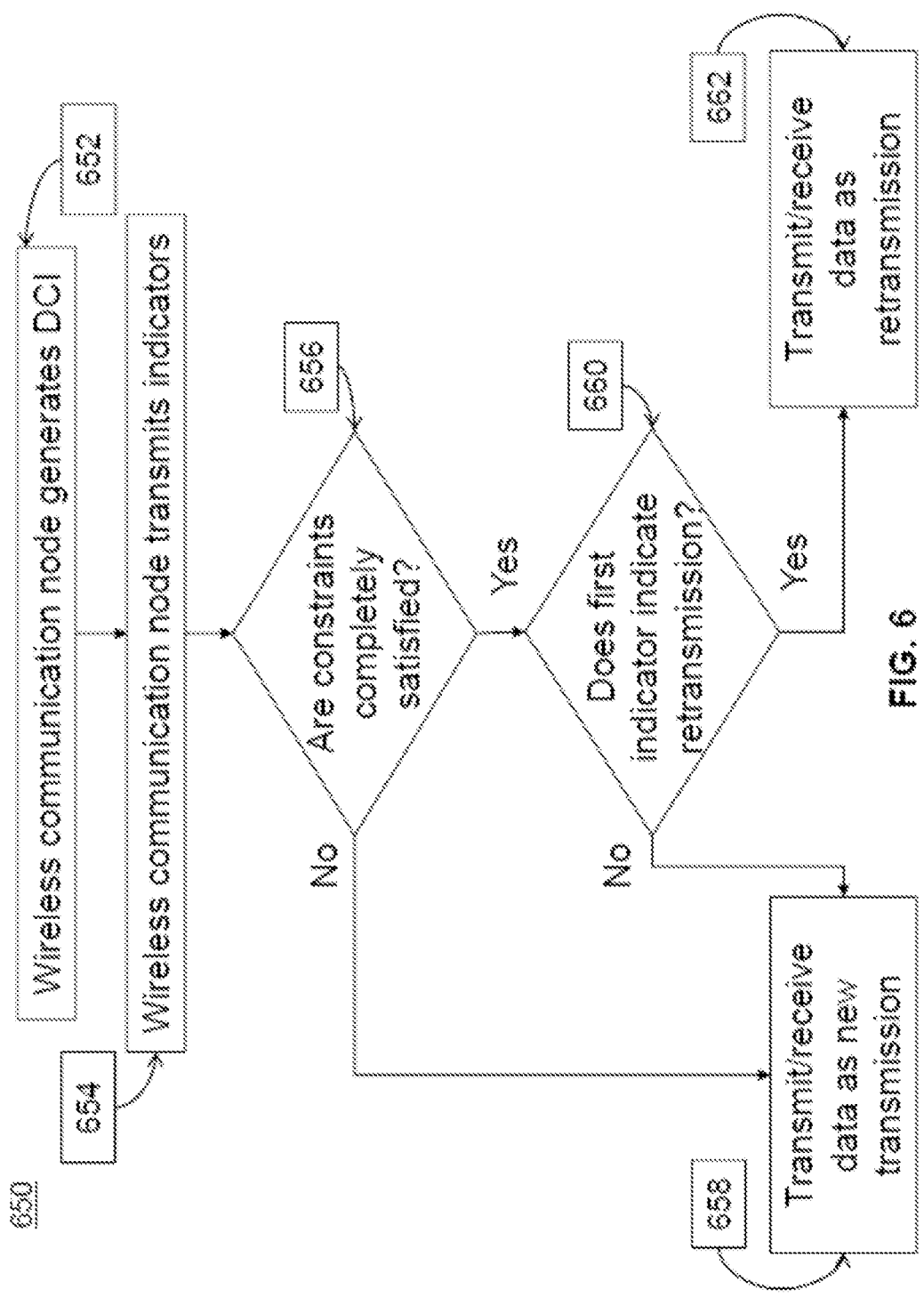
FIG. 6 illustrates a flow diagram of an example method for indicating whether a scheduled data transmission is a retransmission or a new transmission, in accordance with an embodiment of the present disclosure.

J. Methods of Transmitting Data Between Wireless Communication Nodes and Devices FIG. 6 illustrates a flow diagram of a method 650 of generating, transmitting, and/or utilizing indicators indicative of whether a scheduled data transmission is a retransmission or a new transmission. The method 650 may be implemented using any of the components and/or devices detailed herein in conjunction with FIGS. 1-5. In brief overview, the method 650 may include generating a DCI by a wireless communication node (652). The method 650 may include a wireless communication node transmitting indicators (654). The method 650 may include determining whether the constraints are satisfied (656). The method 650 may include transmitting the data as a new transmission (658). The method 650 may include determining whether a first indicator indicates retransmission (660). The method 650 may include transmitting the data as a retransmission (662).

Referring now to operation (652), and in some embodiments, the wireless communication node 302 can generate downlink control information (DCI) 326 including a first indicator. The first indicator may be indicative of whether a scheduled data transmission is a retransmission or a new transmission. The first indicator may include indicator(s) (e.g., MCS, RN, NDI, RV, or other indicators or parameters) to inform a wireless communication device (e.g., a UE) of a scheduled downlink/uplink data and/or whether the data is to be a retransmission of the most recent data transmission or the N-th previous data transmission, wherein N is the retransmission interval. As discussed herein, the use of DCI is provided by way of a non-limiting example, as any other type or form of message, configuration or information can be utilized to communicate the indicator(s) to the wireless communication device.

Referring now to operation (654), and in some embodiments, the wireless communication node 302 can transmit the DCI 326 including the first indicator to a wireless communication device. The first indicator may be indicative of whether a scheduled data transmission is a retransmission (e.g., of previously scheduled/transmitted data) or a new transmission. Based on the determination, the wireless communication node 302 may set, incorporate and/or configured the first indicator in the DCI for instance, for transmission to the wireless communication device.

In some embodiments, the wireless communication device 304 can receive the DCI including a first indicator. The wireless communication device 304 may determine whether a scheduled data transmission is a retransmission according to the first indicator.

Referring now to operation (656), and in some embodiments, the wireless communication node 302 and/or the wireless communication device 304 can determine and/or be caused to determine whether a plurality of constraints are satisfied. If the plurality of constraints are satisfied, the wireless communication node 302 may transmit the scheduled (downlink) data transmission to the wireless communication device 304 as a retransmission or a new transmission. If the plurality of constraints are satisfied, the wireless communication device may receive and/or process the scheduled (downlink) data transmission from the wireless communication device 304 as a retransmission or a new transmission. In some embodiments, if the plurality of constraints are satisfied, the wireless communication device may transmit the scheduled (uplink) data transmission to the wireless communication node as a retransmission or a new transmission. If the plurality of constraints are satisfied, the wireless communication node 302 may receive and/or process the scheduled (uplink) data transmission from the wireless communication device 304 as a retransmission or a new transmission.

In some embodiments, the plurality of constraints may be transmitted by the wireless communication node 302 to the wireless communication device 304 via a second indicator. In some embodiments, the plurality of constraints may be received by the wireless communication device 304 from the wireless communication node 302 via a second indicator. The second indicator may identify, describe or otherwise be indicative of or include the plurality of constraints. The second indicator may identify, describe or include information other than constraint(s). The second indicator may comprise at least one of a valid time interval (e.g., as a constraint), a retransmission threshold (e.g., as a constraint), or a retransmission interval (e.g., may or may not be a constraint). In some embodiments, the wireless communication node 302 may transmit the second indicator to the wireless communication device 304 via at least one of a radio resource control (RRC) configuration, a media access control control element (MAC CE), or any other configuration, mechanism or message (e.g., via DCI). The wireless communication device 304 may receive the second indicator from the wireless communication device 302 via at least one of a radio resource control (RRC) configuration, a media access control control element (MAC CE), or any other configuration, mechanism or message (e.g., via DCI).

In order to determine whether a plurality of constraints are satisfied, the wireless communication node 302 and/or the wireless communication device 304 may determine or consider at least a valid time interval, a time interval, a retransmission count, and/or a retransmission threshold. In some embodiments, the wireless communication node 302 and/or the wireless communication device 304 may determine that a time interval between a transmit or receive time of a first data transmission and a transmit or receive time of a second data transmission is smaller than or equal to (or satisfies) the valid time interval. In some embodiment, the wireless communication node 302 and/or the wireless communication device 304 may determine that a time interval between a transmit or receive time of a first DCI and a transmit or receive time of a second DCI is smaller than or equal to (or satisfies) the valid time interval. In some embodiments, the wireless communication node 302 and/or the wireless communication device 304 may determine that a retransmission count associated with data for the scheduled data transmission is within (or satisfies) a retransmission threshold. In some embodiments, the wireless communication node 302 and/or the wireless communication device 304 may determine whether the scheduled data transmission is (or should be) a retransmission of the most recent data or the N-th previous data, wherein N is the retransmission interval Referring now to operation (658), and in some embodiments, the wireless communication node 302 or the wireless communication device 304 may transmit the scheduled data transmission as a new transmission when/if the plurality of constraints are incompletely satisfied. The wireless communication node 302 or the wireless communication device 304 may receive the scheduled data transmission as a new transmission when/if the plurality of constraints are incompletely satisfied. In some embodiments, the wireless communication node 302 and/or the wireless communication device 304 may ignore (or bypass processing or consideration of) the first indicator responsive to the plurality of constraints being incompletely satisfied.

In certain embodiments, if the plurality of constraints are incompletely satisfied, the wireless communication node 302 may transmit the scheduled (downlink) data transmission to the wireless communication device 304 as a new transmission (e.g., of new data that is different from previously transmitted data). If the plurality of constraints are incompletely satisfied, the wireless communication device may receive and/or process the scheduled (downlink) data transmission from the wireless communication device 304 as a new transmission. In some embodiments, if the plurality of constraints are incompletely satisfied, the wireless communication device may transmit the scheduled (uplink) data transmission to the wireless communication node as a new transmission. If the plurality of constraints are incompletely satisfied, the wireless communication node 302 may receive and/or process the scheduled (uplink) data transmission from the wireless communication device 304 as a new transmission.

Referring now to operation (660), and in some embodiments, the wireless communication node 302 and/or the wireless communication device 304 may determine that a scheduled data transmission is a retransmission based on a value or change in value of the first indicator. In some embodiments, the wireless communication device 304 may determine, consider or evaluate the first indicator (e.g., in the DCI provided by the wireless communication node) responsive to the plurality of constraints being completely satisfied. The wireless communication device 304 may determine, consider or evaluate the first indicator after (or in response to) determining that the plurality of constraints are completely satisfied. The first indicator may be indicative of whether a scheduled (uplink/downlink) data transmission is a retransmission. The first indicator may comprise at least one of a modulation and coding scheme (MCS), a repetition number (RN), a new data indicator (NDI), a redundancy version (RV), or other indicators or parameters. In some embodiments, the first indicator may be indicative of whether the scheduled data transmission is a retransmission according to a value of the NDI or the RV. As an example, the wireless communication node 302 may transmit the scheduled (downlink) data transmission to the wireless communication device 304 as a retransmission or a new transmission (e.g., consistent with the first indicator, or responsive to the first indicator) when/if the plurality of constraints are completely satisfied.

In some embodiments, the first indicator may be indicative of whether the scheduled data transmission is a retransmission according to a change in value of the MCS or the RN. For example, the wireless communication node 302 and/or the wireless communication device may determine that a modulation and coding scheme (MCS) has changed from a first scheme to a second scheme. The first scheme may correspond to a most recent data transmission. The second scheme may correspond to the scheduled data transmission. If an MCS changes from a first scheme to a second scheme, this may cause the transport block size to change. The wireless communication node 302 and/or the wireless communication device may determine that a maximum transport block size of the second scheme may be larger or equal to an actual transport block size of a most recent data transmission corresponding to the first scheme. If the maximum transport block size of the second scheme is larger or equal to the transport block size of the first scheme, the wireless communication node 302 and/or the wireless communication device may determine that the scheduled data transmission is a retransmission.

Referring now to operation (662), and in some embodiments, the wireless communication node 302 or the wireless communication device 304 may transmit the scheduled data as a retransmission. For example, the wireless communication device 304 may transmit the scheduled data as a retransmission, responsive to determining that the first indicator indicates that the scheduled data transmission is a retransmission, and/or determining that the plurality of constraints are satisfied. The wireless communication node 302 or the wireless communication device 304 may receive the scheduled data as a retransmission. For example, the wireless communication device 304 may receive the scheduled (downlink) data as a retransmission, responsive to determining that the first indicator indicates that the scheduled (downlink) data transmission is a retransmission, and/or determining that the plurality of constraints are satisfied.

The scheduled (downlink) data transmission may be transmitted to the wireless communication device 306 as a retransmission, if the plurality of constraints are completely satisfied and at least one of the first indicators (e.g., MCS, NDI, RV, RN, or any other indicator) is indicative of a retransmission. The scheduled (downlink) data transmission may be received by the wireless communication device 306 as a retransmission, if the plurality of constraints are completely satisfied and at least one of the first indicators (e.g., MCS, NDI, RV, RN, or any other indicator) is indicative of a retransmission. The plurality of constraints may comprise at least one of a valid time interval, or a retransmission threshold. If a time interval or a retransmission count are less than or equal to the valid time interval or the retransmission threshold respectively, the plurality of constraints may be satisfied.

The wireless communication device or the wireless communication node may receive and/or process the scheduled data as a retransmission. For instance, the wireless communication device or the wireless communication node may receive and/or process the scheduled (downlink) data as a retransmission, responsive to determining that the first indicator indicates that the scheduled data transmission is a retransmission, and/or determining that the plurality of constraints are satisfied. The wireless communication device or the wireless communication node may receive and/or process the scheduled data as a retransmission, if the plurality of constraints are completely satisfied and at least one of the conditions and/or indicators (e.g., MCS, NDI, RV, RN) is indicative of (or justifies) a retransmission.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device.

A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
   generating, by a wireless communication node, downlink control information (DCI) including a field comprising a first indicator, the first indicator comprising at least one of a change in a value of a modulation and coding scheme (MCS) or a repetition number (RN);
   transmitting, by the wireless communication node, the DCI including the first indicator included in the field to a wireless communication device, the first indicator indicative of whether a scheduled data transmission is to be a retransmission of a most recent data transmission; and
   determining, by the wireless communication node, a valid time interval, and that a time interval between at least one of:
      respective transmit times or respective receive times of a first data transmission and a second data transmission, or
      a transmit time of a first DCI and a transmit time of a second DCI is smaller than or equal to the valid time interval.

2. The method of claim 1, comprising transmitting, by the wireless communication node, a second indicator to the wireless communication device, the second indicator including a plurality of constraints.

3. The method of claim 2, comprising transmitting, by the wireless communication node, the second indicator via at least one of a radio resource control (RRC) configuration or a media access control control element (MAC CE).

4. The method of claim 2, wherein the second indicator comprises at least one of a valid time interval, a retransmission threshold, or a retransmission interval.

5. The method of claim 2, further comprising:
   causing the wireless communication device to determine whether the plurality of constraints are satisfied; and
   receiving, by the wireless communication node from the wireless communication device, the scheduled data transmission as the retransmission or a new transmission when the plurality of constraints are satisfied, and as the new transmission when the plurality of constraints are incompletely satisfied.

6. The method of claim 2, further comprising transmitting, by the wireless communication node to the wireless communication device, the scheduled data transmission as the retransmission or a new transmission when the plurality of constraints are satisfied, and as the new transmission when the plurality of constraints are incompletely satisfied.

7. The method of claim 1, comprising determining, by the wireless communication node, whether the scheduled data transmission is the retransmission of the most recent data transmitted or an N-th previous data transmitted.

8. The method of claim 1, comprising:
   determining, by the wireless communication node, that the MCS has changed from a first scheme for the most recent data transmission, to a second scheme for the scheduled data transmission; and
   determining, by the wireless communication node, whether the scheduled data transmission is the retransmission, responsive to a maximum transport block size of the second scheme being larger than or equal to an actual transport block size of a most recent data transmission corresponding to the first scheme.

9. The method of claim 1, comprising determining, by the wireless communication node, that a retransmission count associated with data for the scheduled data transmission is within a retransmission threshold.

10. A method, comprising:

receiving, by a wireless communication device from a wireless communication node, downlink control information (DCI) including a field comprising a first indicator, the first indicator comprising at least one of a change in a value of a modulation and coding scheme (MCS) or a repetition number (RN);

determining, by the wireless communication device according to the first indicator included in the field, whether a scheduled data transmission is to be a retransmission of a most recent data transmission; and determining, by the wireless communication device, a valid time interval, and that a time interval between at least one of:

respective transmit times or respective receive times of a first data transmission and a second data transmission, or a transmit time of a first DCI and a transmit time of a second DCI is smaller than or equal to the valid time interval.

11. The method of claim 10, comprising receiving, by the wireless communication device, a second indicator from the wireless communication node, the second indicator including a plurality of constraints.

12. A wireless communication node, comprising:

at least one processor configured to:

generate downlink control information (DCI) including a field comprising a first indicator, the first indicator comprising at least one of a change in a value of a modulation and coding scheme (MCS) or a repetition number (RN);

transmit, via a transmitter, the DCI including the first indicator included in the field to a wireless communication device, the first indicator indicative of whether a scheduled data transmission is to be a retransmission of a most recent data transmission; and determine a valid time interval, and that a time interval between at least one of:

respective transmit times or respective receive times of a first data transmission and a second data transmission, or a transmit time of a first DCI and a transmit time of a second DCI is smaller than or equal to the valid time interval.

13. The wireless communication node of claim 12, wherein the at least one processor is further configured to transmit, via the transmitter to the wireless communication device, a second indicator including a plurality of constraints.

14. A wireless communication device, comprising:

at least one processor configured to:

receive, via a receiver from a wireless communication node, downlink control information (DCI) including a field comprising a first indicator, the first indicator comprising at least one of a change in a value of a modulation and coding scheme (MCS) or a repetition number (RN);

determine, according to the first indicator included in the field, whether a scheduled data transmission is to be a retransmission of a most recent data transmission; and determine a valid time interval, and that a time interval between at least one of:

respective transmit times or respective receive times of a first data transmission and a second data transmission, or a transmit time of a first DCI and a transmit time of a second DCI is smaller than or equal to the valid time interval.

15. The wireless communication device of claim 14, wherein the at least one processor is further configured to receive, via the receiver from the wireless communication node, a second indicator including a plurality of constraints.

* * * * *